(12) United States Patent
Ma et al.

(10) Patent No.: US 12,146,579 B2
(45) Date of Patent: Nov. 19, 2024

(54) FLUID ADJUSTING DEVICE

(71) Applicant: Illinois Tool Works Inc., Glenview, IL (US)

(72) Inventors: Yue Ma, Shanghai (CN); Michael Henker, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 132 days.

(21) Appl. No.: 18/094,175

(22) Filed: Jan. 6, 2023

(65) Prior Publication Data

US 2023/0220844 A1 Jul. 13, 2023

(30) Foreign Application Priority Data

Jan. 13, 2022 (CN) .......................... 202210038866.6
Dec. 15, 2022 (CN) .......................... 202211612768.5

(51) Int. Cl.
*F16K 21/00* (2006.01)
*F01P 11/02* (2006.01)

(52) U.S. Cl.
CPC ............. *F16K 21/00* (2013.01); *F01P 11/029* (2013.01)

(58) Field of Classification Search
None
See application file for complete search history.

(56) References Cited

U.S. PATENT DOCUMENTS

| 6,981,545 | B2 * | 1/2006 | Damson | .................... | F01P 3/20 |
| | | | | | 237/12.3 A |
| 2020/0149464 | A1 * | 5/2020 | Trythall | ............... | F01P 11/0204 |
| 2023/0384808 | A1 * | 11/2023 | Mimura | ............... | G05D 23/134 |

FOREIGN PATENT DOCUMENTS

| CN | 216618640 | U | * | 5/2022 | | |
| DE | 102007054855 | A1 | * | 5/2009 | ............ | F01P 11/029 |
| DE | 102019212096 | A1 | * | 2/2021 | .............. | B60T 11/26 |
| DE | 102022114003 | A1 | * | 12/2022 | | |
| EP | 4212710 | A1 | | 12/2023 | | |

OTHER PUBLICATIONS

CN-216618640-U Translation (Year: 2022).*
DE-102007054855-A1 Translation (Year: 2009).*
DE-102019212096-A1 Translation (Year: 2021).*
DE-102022114003-A1 Translation (Year: 2022).*

* cited by examiner

*Primary Examiner* — Umashankar Venkatesan
(74) *Attorney, Agent, or Firm* — McAndrews, Held & Malloy, Ltd.

(57) ABSTRACT

A fluid adjusting device includes a reservoir, at least two connection channels, at least two supply channels and at least one one-way valve, the reservoir is provided with a fluid storage cavity and at least two fluid outlets in communication with the fluid storage cavity, and the fluid storage cavity is configured to store a cooling fluid; the at least two connection channels can be connected to at least two circulation circuits respectively; the at least two fluid outlets are in communication with the at least two connection channels by means of the at least two supply channels respectively; and the at least one one-way valve is arranged in at least one of the at least two supply channels, and is configured to enable a fluid to flow from the reservoir to the corresponding connection channel in unidirectional manner. The fluid adjusting device can accurately control temperatures.

10 Claims, 11 Drawing Sheets

FLUID ADJUSTING DEVICE

RELATED APPLICATIONS

The present application claims the benefit of Chinese Patent Application Nos. 202210038866.6, filed Jan. 13, 2022, and 202211612768.5, filed Dec. 15, 2022, each titled "Fluid Adjusting Device," the contents of which are hereby incorporated by reference.

FIELD

The present disclosure relates to a fluid adjusting device, and particularly relates to a fluid adjusting device for a heat management system in a vehicle.

BACKGROUND

Temperatures of components (for example, a battery, an electric motor, etc.) in a vehicle are required to be controlled within a preset range such that the components have excellent operation performances. Therefore, a heat management system is required for adjusting the temperatures of the components. In addition, in a system capable of implementing a plurality of functions, since a fluid in a pipe is required to flow along different paths under different modes, a fluid adjusting device in the heat management system may switch paths of the fluid in the pipe.

SUMMARY

The present disclosure relates generally to a fluid adjusting device, substantially as illustrated by and described in connection with at least one of the figures, as set forth more completely in the claims.

DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
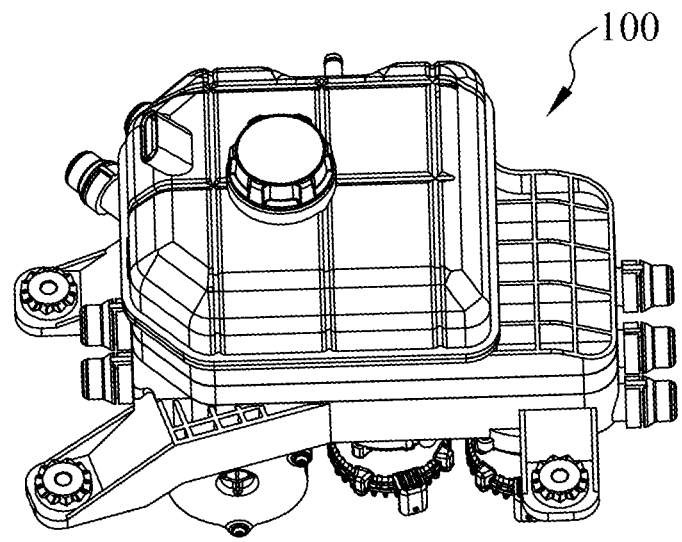
FIG. 1A is a perspective view of a fluid adjusting device according to an embodiment of the present disclosure.

Various specific implementations of the present disclosure will be described below with reference to the accompanying drawings which constitute part of this description. It is to be understood that although the terms indicating orientations, such as "front", "rear", "upper", "lower", "left", "right", "top" and "bottom", are used in the present disclosure to describe orientations of structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are merely illustrative and should not be considered as limitations. If possible, the same or similar reference numerals used in the present disclosure refer to the same components.

The present disclosure provides a fluid adjusting device. The fluid adjusting device includes: a reservoir, at least two connection channels, at least two supply channels and at least one one-way valve, where the reservoir is provided with a fluid storage cavity and at least two fluid outlets, the at least two fluid outlets are in communication with the fluid storage cavity, and the fluid storage cavity is configured to store a cooling fluid; the at least two connection channels may be connected to at least two circulation circuits respectively; the at least two fluid outlets are in communication with the at least two connection channels by means of the at least two supply channels respectively; and the at least one one-way valve is arranged in at least one of the at least two supply channels, and is configured to enable a fluid to flow from the reservoir to the corresponding connection channel in unidirectional manner.

The fluid adjusting device as mentioned above further includes a flow dividing component. The flow dividing component is connected to the reservoir, and the at least two connection channels are fluid channels arranged on the flow dividing component.

The fluid adjusting device as mentioned above further includes at least one pump. The at least one pump is arranged in one of the at least two connection channels, and is configured to enable a fluid in the corresponding connection channel to flow in a predetermined direction.

According to the fluid adjusting device as mentioned above, in a flow direction of the fluid in the connection channel, the at least one pump is located downstream of a connection section between the corresponding supply channel and the connection channel.

According to the fluid adjusting device as mentioned above, the at least one pump is close to a connection section between the corresponding supply channel and the connection channel.

The fluid adjusting device as mentioned above further includes several additional connection channels and a multi-channel valve portion. The several additional connection channels are arranged on the flow dividing component, the multi-channel valve portion is connected to the several additional connection channels and the at least two connection channels, wherein the multi-channel valve portion may be adjusted to change a connection relationship between the several additional connection channels and the at least two connection channels such that the fluid adjusting device may form different circulation circuits.

According to the fluid adjusting device as mentioned above, the reservoir includes a reservoir housing, a bottom of the reservoir housing and the flow dividing component form part of the several additional connection channels and the at least two connection channels.

According to the fluid adjusting device as mentioned above, the at least one one-way valve is integrated in the corresponding supply channel.

According to the fluid adjusting device as mentioned above, the at least one one-way valve is configured to prevent a fluid from flowing to the reservoir, so as to prevent a fluid in the circulation circuit connected to the at least one one-way valve from being mixed with fluids in other circulation circuits.

According to the fluid adjusting device as mentioned above, the reservoir includes an inner gas discharge channel. The inner gas discharge channel is located in the reservoir, one end of the inner gas discharge channel penetrates through the bottom of the reservoir housing to be in communication with one or more of the several additional connection channels and the at least two connection channels, so as to receive gas discharged from the several additional connection channels and the at least two connection channels, and the other end of the inner gas discharge channel is spaced apart from a top of the reservoir.

The reservoir further includes an inner gas discharge channel cover portion, the inner gas discharge channel cover portion is in the shape of a hollow cylinder, the inner gas discharge channel cover portion extends downwards from the top of the reservoir, the inner gas discharge channel may extend into the inner gas discharge channel cover portion, and a side wall opening is provided on a side wall of the inner gas discharge channel cover portion, so as to allow gas in the inner gas discharge channel to pass through.

The fluid adjusting device of the present disclosure is in communication with a plurality of circulation circuits, and the fluid adjusting device of the present disclosure is provided with a one-way valve, such that changes in temperatures of fluids due to mixing of a large amount of fluids with different temperatures in the plurality of circulation circuits may be avoided, and the temperatures may be accurately controlled. In addition, the reservoir of the fluid adjusting device of the present disclosure is provided with a gas discharge channel such that gas may be discharged, so as to prevent excessive gas being accumulated in circulation circuits from affecting the heat exchange efficiency and the service life of a pump.

Figure 1B:
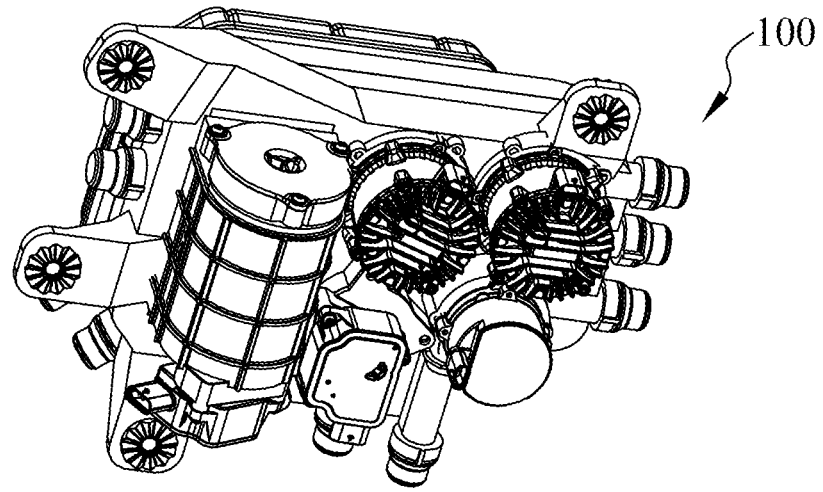
FIG. 1B is a perspective view of the fluid adjusting device in FIG. 1A from another perspective.
Figure 1C:
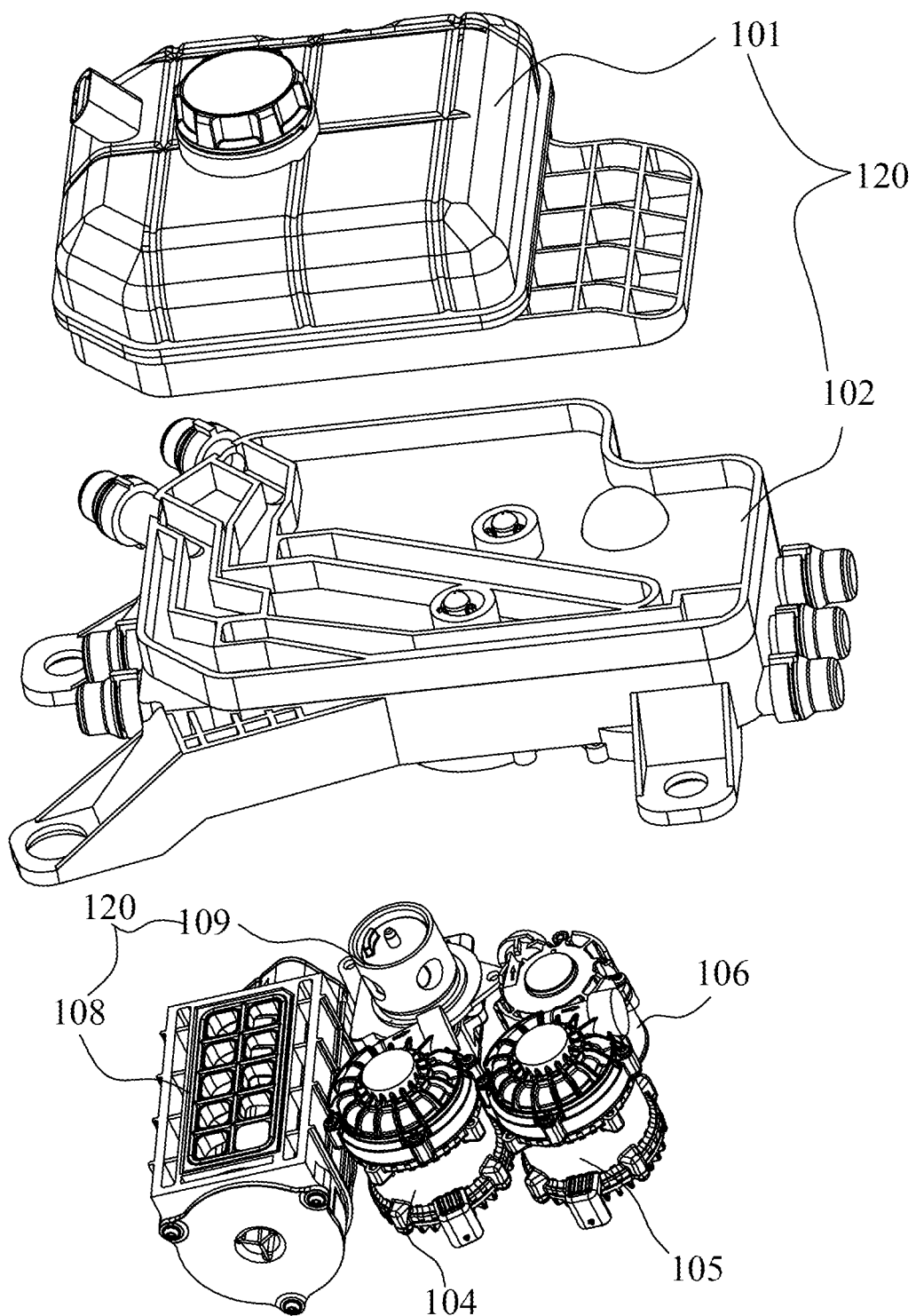
FIG. 1C is an exploded view of the fluid adjusting device in FIG. 1A.

FIG. 1A is a perspective view of a fluid adjusting device according to an embodiment of the present disclosure, so as to show a front side of the fluid adjusting device. FIG. 1B is a perspective view of the fluid adjusting device in FIG. 1A from another perspective, so as to show an opposite side of the fluid adjusting device. FIG. 1C is an exploded view of the fluid adjusting device in FIG. 1A, so as to show components constituting the fluid adjusting device. As shown in FIGS. 1A-1C, a fluid adjusting device 100 includes a reservoir 101, a flow dividing component 102, a first pump 104, a second pump 105, a third pump 106 and a multi-channel valve portion 120. An upper portion of the flow dividing component 102 is connected to a lower portion of the reservoir 101, and a lower portion of the flow dividing component 102 is connected to the first pump 104, the second pump 105, the third pump 106 and the multi-channel valve portion 120. A cooling fluid in the reservoir 101 may enter the flow dividing component 102, and is divided into a plurality of fluids in the flow dividing component 102. The fluid adjusting device 100 is in communication with a plurality of external components. Under the action of the first pump 104, the second pump 105, the third pump 106 and the multi-channel valve portion 120, the cooling fluid may flow through one or more of the plurality of components and then return to the fluid adjusting device, so as to form a plurality of circulation circuits. By adjusting circulation states of a plurality of fluids, different circulation circuits are formed between the fluid adjusting device and a plurality of external components, so as to form a plurality of working modes, for example, a plurality of temperature adjusting modes in a vehicle can be realized. The multi-channel valve portion 120 includes a first multi-channel valve 108 and a second multi-channel valve 109.

Figure 2A:
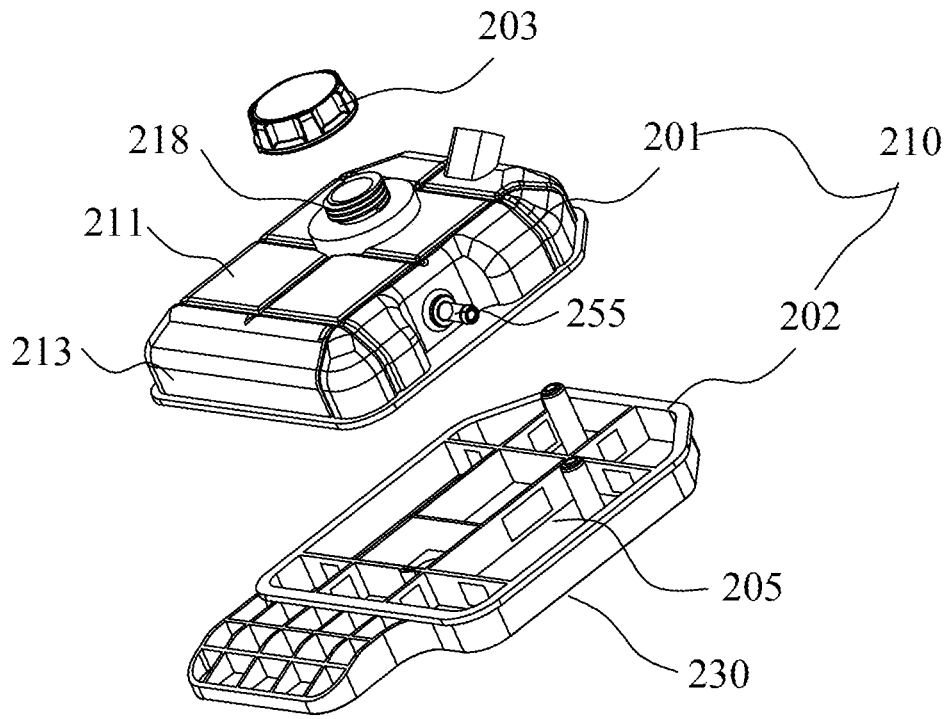
FIG. 2A is an exploded view of a reservoir in FIG. 1A.
Figure 2B:
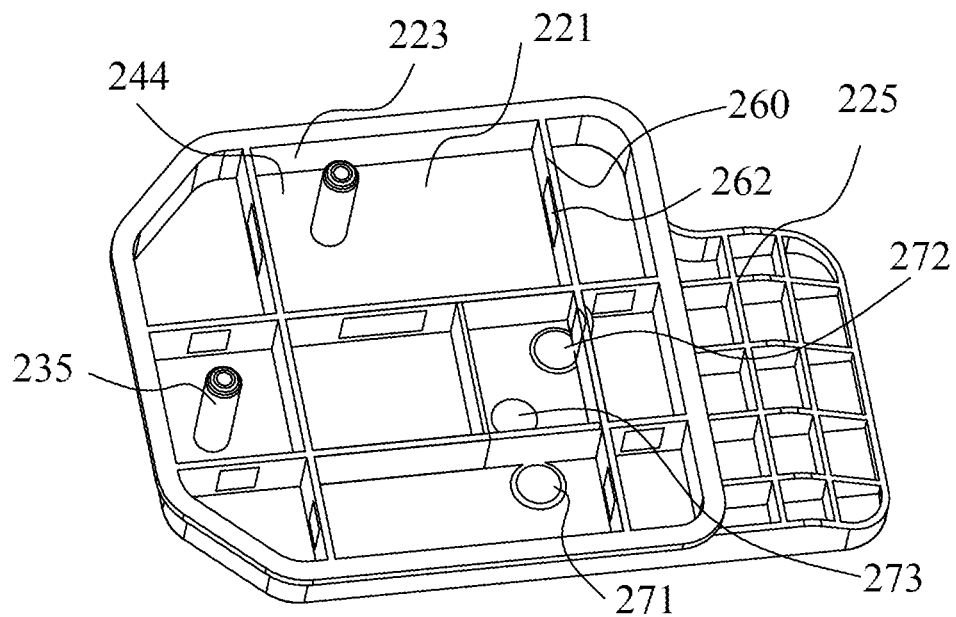
FIG. 2B is a perspective view of a lower housing of the reservoir in FIG. 2A.
Figure 2C:
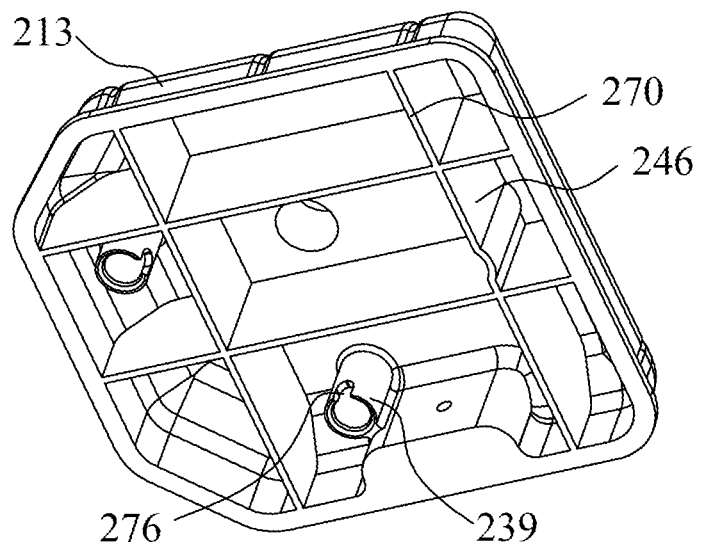
FIG. 2C is a perspective view of an upper housing of the reservoir in FIG. 2A.
Figure 2D:
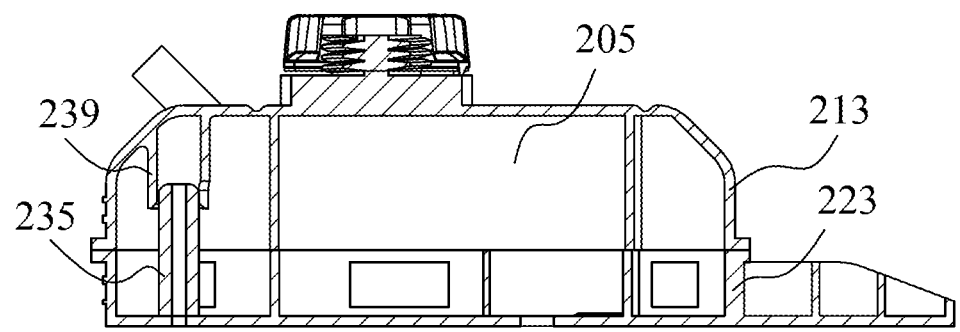
FIG. 2D is a sectional view of the reservoir in FIG. 2A.

FIG. 2A is an exploded view of the reservoir in FIG. 1A. FIG. 2B is a perspective view of a lower housing of the reservoir in FIG. 2A. FIG. 2C is a perspective view of an upper housing of the reservoir in FIG. 2A. FIG. 2D is a sectional view of the reservoir in FIG. 2A. As shown in FIGS. 2A-2D, the reservoir 101 includes a reservoir housing 210 and a pressure cap 203. The reservoir housing 210 includes an upper housing 201 and a lower housing 202. The upper housing 201 is connected to the lower housing 202 to delimit a fluid storage cavity 205, and the fluid storage cavity 205 is used for accommodating the cooling fluid. A bottom 230 of the reservoir housing 210 is connected to the flow dividing component 102.

As shown in FIG. 2B, the lower housing 202 includes a lower housing bottom 221, a lower housing edge 223 and an extension portion 225. The lower housing bottom 221 forms a bottom 230 of the reservoir housing 210. The lower housing edge 223 extends upwardly from a peripheral edge of the lower housing bottom 221, so as to form a substantially disc shape with the lower housing bottom 221. The lower housing edge 223 and the lower housing bottom 221 delimit a lower fluid storage space 244. The extension portion 225 is formed by extending from one side of the lower housing bottom 221 and the lower housing edge 223.

The lower housing 202 further includes an inner gas discharge channel 235, and the inner gas discharge channel 235 is in the shape of a hollow cylinder and extends in a direction substantially perpendicular to the lower housing 202. One end of the inner gas discharge channel 235 is connected to the lower housing bottom 221 and extends through the lower housing bottom 221. The other end of the inner gas discharge channel 235 is located in the fluid storage cavity 205, and is spaced apart from an inner surface of the upper housing 201. Gas may enter the fluid storage cavity 205 from a space below the lower housing bottom 221 by means of the inner gas discharge channel 235.

The lower housing 202 is provided with partition walls 260, and the partition walls 260 extend from the lower housing bottom 221 in a direction substantially perpendicular to the lower housing bottom 221. The partition walls 260 partition the lower fluid storage space 244 into a plurality of regions. The partition walls 260 are provided with openings 262 such that adjacent regions may be in communication with each other by means of the openings 262.

The lower housing bottom 221 is provided with fluid outlets 271, 272 and 273 penetrating through the lower housing bottom 221, and the lower fluid storage space 244 is in communication with a space below the lower housing bottom 221 by means of the fluid outlets 271, 272 and 273 such that a fluid in the lower fluid storage space 244 may enter the flow dividing component 102 below the lower housing bottom 221 by means of the fluid outlets 271, 272 and 273.

The upper housing 201 is substantially disc-shaped, and includes an upper housing top 211 and an upper housing edge 213 extending downwards from a peripheral edge of the upper housing top 211. The upper housing top 211 and the upper housing edge 213 delimit an upper fluid storage space 246.

The upper housing top 211 is provided with an opening 218, and the pressure cap 203 is detachably connected to the opening 218. When the reservoir 101 is required to be replenished with a fluid, the pressure cap 203 may be opened to add the fluid to the reservoir 101 through the opening 218. When the fluid adjusting device 100 operates, the pressure cap 203 is connected to the upper housing 201, and the pressure cap 203 is configured such that when the pressure in the fluid storage cavity 205 is greater than a predetermined value, the pressure cap 203 may be opened to relieve pressure; and when the pressure in the fluid storage cavity 205 is less than the predetermined value, the pressure cap 203 is closed.

The upper housing 201 further includes an outer gas discharge channel 255, and the outer gas discharge channel 255 is in the shape of a hollow cylinder. One end of the outer gas discharge channel 255 is connected to the upper housing edge 223, and extends through the upper housing edge 223 to be in communication with the upper fluid storage space 246. The other end of the outer gas discharge channel 255 is connected to an external pipe, and gas in the external pipe may enter the upper fluid storage space 246 by means of the outer gas discharge channel 255.

The upper housing 202 is provided with partition walls 270, and the partition walls 270 extend from the lower housing bottom 221 in a direction substantially perpendicular to the upper housing top 211. The partition walls 270 partition the upper fluid storage space 246 into a plurality of regions.

The upper housing 201 further includes an inner gas discharge channel cover portion 239, and the inner gas discharge channel cover portion 239 extends from the upper housing top 211. A proximal end of the inner gas discharge channel cover portion 239 is blocked by the upper housing top 211. A distal end of the inner gas discharge channel cover portion 239 is provided with an end opening, so as to allow the inner gas discharge channel 235 to extend into the inner gas discharge channel cover portion 239. A side wall opening 276 is provided on a side wall of the inner gas discharge channel cover portion 239 to allow gas in the inner gas discharge channel 235 to pass through. In the case that the upper housing 201 is connected to the lower housing 202, the inner gas discharge channel 235 extends into the inner gas discharge channel cover portion 239, and a height of the inner gas discharge channel 235 does not exceed a height of the side wall opening 276 to facilitate gas in the inner gas discharge channel 235 to enter the upper fluid storage space 246 through the side wall opening 276. The inner gas discharge channel cover portion 239 is used for preventing a fluid from entering the inner gas discharge channel 235.

As shown in FIG. 2D, in the case that the upper housing 201 is connected to the lower housing 202, the upper housing edge 213 and the lower housing edge 223 are connected to each other to delimit a hollow fluid storage cavity 205. An extension direction of the upper housing edge 213 and the lower housing edge 223 is a thickness direction. The fluid storage cavity 205 is substantially in a flat shape.

Figure 3A:
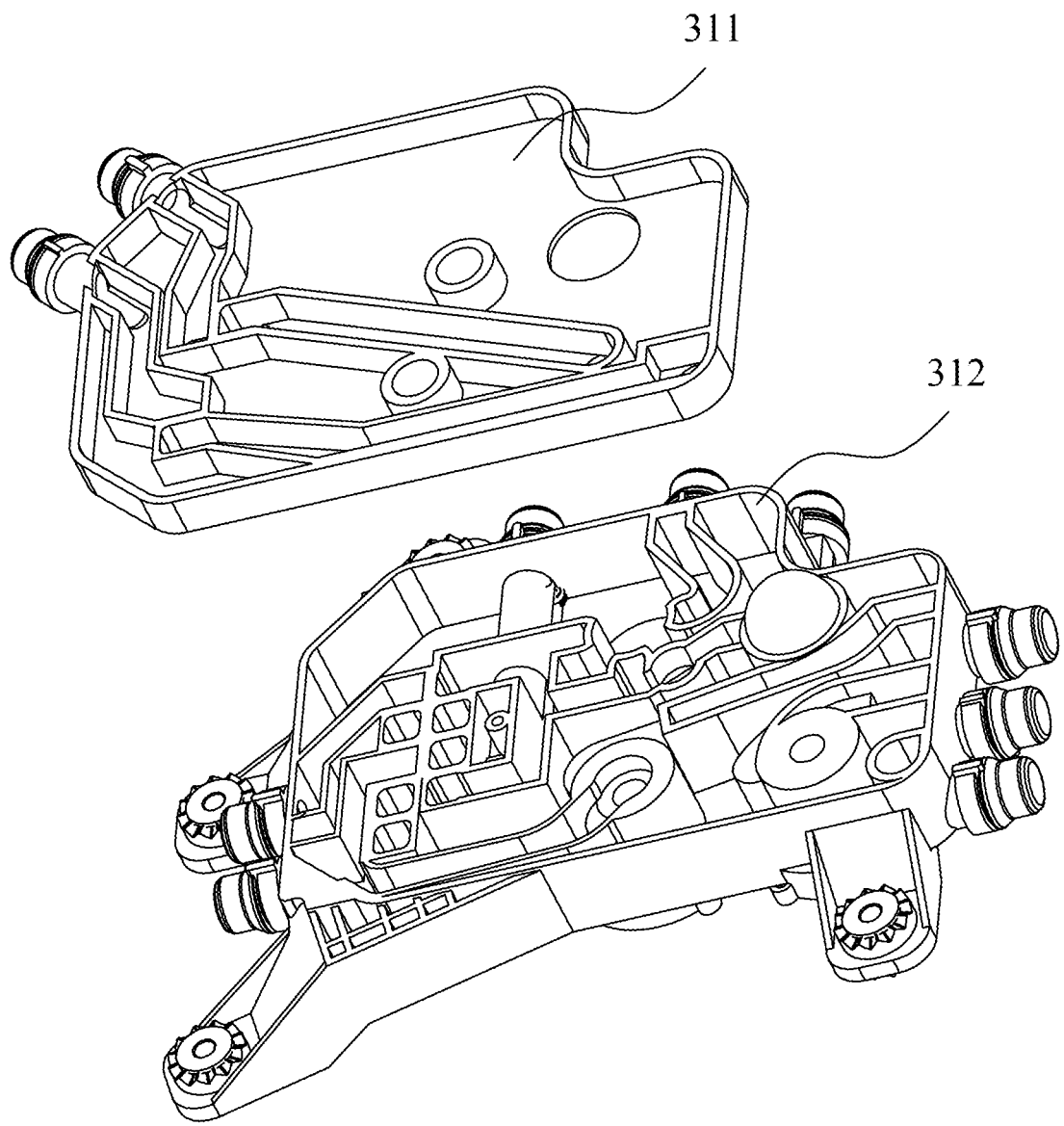
FIG. 3A is an exploded view of a flow dividing component 102 according to the present disclosure.
Figure 3B:
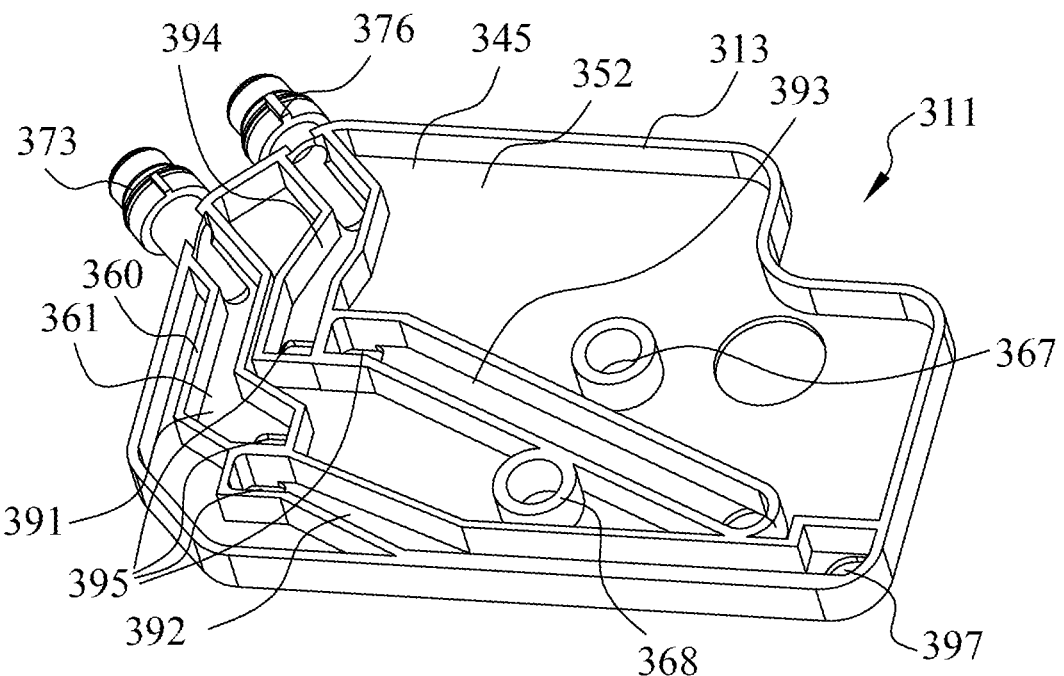
FIG. 3B is a perspective view of an upper flow dividing plate of the flow dividing component in FIG. 3A.
Figure 3C:
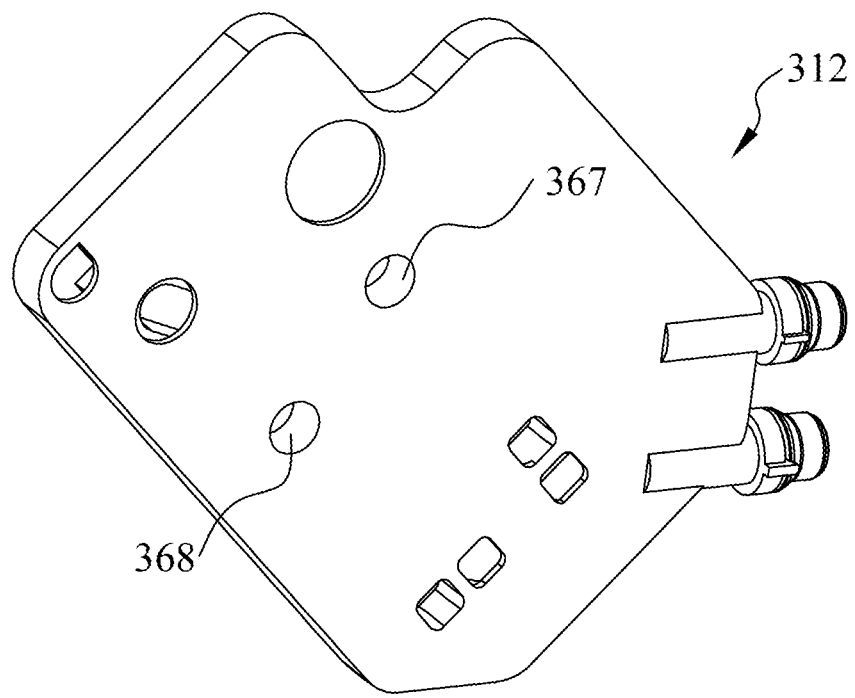
FIG. 3C is a perspective view of the upper flow dividing plate in FIG. 3B from another perspective.
Figure 3D:
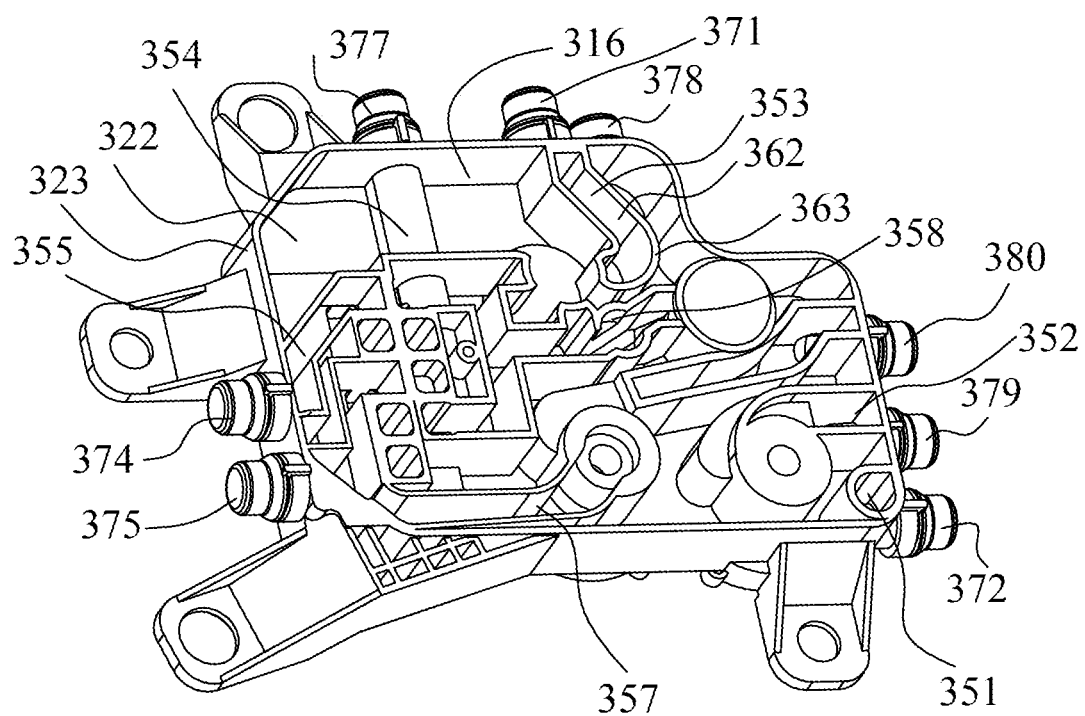
FIG. 3D is a perspective view of a lower flow dividing plate of the flow dividing component in FIG. 3A.
Figure 3E:
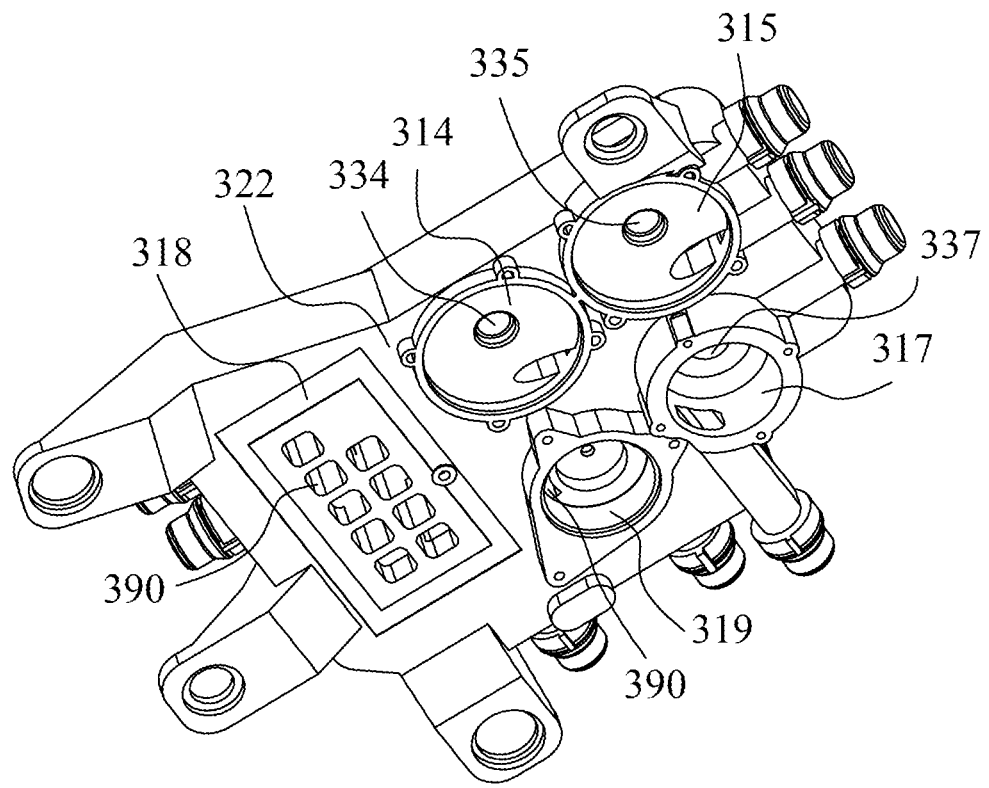
FIG. 3E is a perspective view of the lower flow dividing plate in FIG. 3D from another perspective.
Figure 3F:
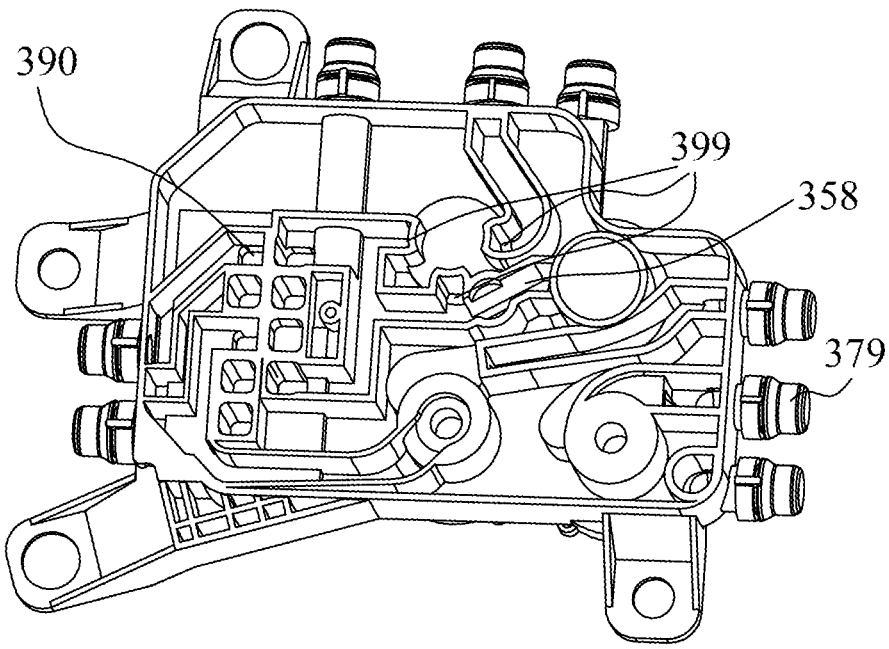
FIG. 3F is a perspective view of the lower flow dividing plate in FIG. 3D from yet another perspective.

FIG. 3A is an exploded view of the flow dividing component 102 in the present disclosure. FIG. 3B is a perspective view of an upper flow dividing plate of the flow dividing component in FIG. 3A. FIG. 3C is a perspective view of the upper flow dividing plate in FIG. 3B from another perspective. FIG. 3D is a perspective view of a lower flow dividing plate of the flow dividing component in FIG. 3A. FIG. 3E is a perspective view of the lower flow dividing plate in FIG. 3D from another perspective. FIG. 3F is a perspective view of the lower flow dividing plate in FIG. 3D from yet another perspective.

As shown in FIGS. 3A-3F, the flow dividing component 102 includes an upper flow dividing plate 311 and a lower flow dividing plate 312. The upper flow dividing plate 311 is connected to the reservoir 101, and the lower flow dividing plate 312 is connected to the reservoir 101, the flow dividing component 102, the first pump 104, the second pump 105, the third pump 106, the first multi-channel valve 108 and the second multi-channel valve 109. A plurality of fluid channels are arranged in the flow dividing component 102, and include connection channels 358 and 357, supply channels 368, 367 and additional connection channels.

With reference to FIGS. 3B and 3C, the upper flow dividing plate 311 is provided with a bottom 352 and a side edge 313 extending upwards from an edge of the bottom 352. The bottom 352 and the side edge 313 define an upper flow dividing space 345. The upper flow dividing plate 311 internally includes flow dividing walls 360 extending upwards from the bottom 352, and tops of the flow dividing walls 360 are in contact with the lower housing bottom 221, such that the flow dividing walls 360 divide the upper flow dividing space 345 into a plurality of upper fluid channels 361.

The upper fluid channels 361 include a plurality of additional connection channels 391, 392, 393, 394, each of the plurality of additional connection channels 391, 392, 393, 394 is provided with a port 395, and the plurality of additional connection channels 391, 392, 393, 394 may be in communication with the multi-channel valve portion 120 by means of the corresponding ports 395. The additional connection channels 392 are in communication with a space below the upper flow dividing plate 311 by means of communication holes 397. The side edge 313 of the upper flow dividing plate 311 is provided with outer guide pipes 376 and 373, one ends of the outer guide pipes 376 and 373 are in communication with the additional connection channels 391 and 394 respectively, and the other ends thereof are in communication with external pipes. The additional connection channel 393 is in communication with the reservoir 101 by means of the fluid outlet 273.

The upper fluid channels 361 include supply channels 368 and 367, one ends of the supply channels 368 and 367 are in communication with the fluid outlets 271 and 272 respectively, and the other ends thereof are in communication with a space below the upper flow dividing plate 311, such that the fluid in the reservoir 101 may be guided into the space below the upper flow dividing plate 311. In an embodiment of the present disclosure, one-way valves are arranged in the supply channels 368 and 367 such that a fluid may only flow from the reservoir 101 to the flow dividing component 102 by means of the supply channels 368 and 367.

With reference to FIGS. 3D and 3E, a plurality of lower fluid channels are provided in the lower flow dividing space 316. The lower flow dividing plate 312 is provided with a bottom 322 and a side edge 323 extending upwards from an edge of the bottom 322. The bottom 352 and the side edge 313 define a lower flow dividing space 316 therebetween. The lower flow dividing plate 312 internally includes flow dividing walls 363 extending upwards from the bottom 322. Lower fluid channels 362 may be formed between adjacent flow dividing walls 363. One part of the flow dividing walls 363 may be in contact with the upper flow dividing plate 311, and the other part thereof is spaced apart from the upper flow dividing plate 311. The flow dividing walls 363 spaced apart from the upper flow dividing plate 311 may form the lower fluid channels 362 or a section of the lower fluid channels 362 with enclosure parts connected to tops of the flow dividing walls. That is, the lower fluid channels 362 are formed by the lower flow dividing plate 312 or by both the upper flow dividing plate 311 and the lower flow dividing plate 312.

Part of the plurality of lower fluid channels 362 include parts having different heights in a thickness direction, so as to avoid unnecessary communication between two channels. That is, when two channels are not required to be in communication with each other, portions of the two channels close to the intersection thereof may be arranged at different positions in the thickness direction such that the two channels are independent from each other.

The lower fluid channels 362 include connection channels 357 and 358, and additional connection channels 351, 352, 353, 354, 355. The side edge 323 of the lower flow dividing plate 312 is provided with outer guide pipes 371, 372, 374, 375, 377, 378, 379 and 380. The connection channel 357 is connected to the outer guide pipes 375 and 380, the multi-channel valve portion 120 and the supply channel 368. The connection channel 358 is connected to the multi-channel valve portion 120, the outer guide pipe 378 and the supply channel 367. The connection channels 357 and 358 may be connected to corresponding circulation circuits. The additional connection channel 351 is connected to the outer guide pipe 372, the additional connection channel 392 and the multi-channel valve portion 120. The additional connection channel 351 is connected to the outer guide pipe 379, the additional connection channel 393 and the multi-channel valve portion 120. The additional connection channel 353 is connected to the outer guide pipe 371 and the multi-channel valve portion 120. The additional connection channel 354 is connected to the outer guide pipe 377 and the multi-channel valve portion 120. The additional connection channel 355 is connected to the outer guide pipe 374 and the multi-channel valve portion 120.

In this embodiment, the connection channel 357 and the connection channel 358 are in communication with the supply channels 368 and 367 respectively, and one-way valves are arranged in the supply channels 368 and 367, that is, the connection channels refer to fluid channels in direct communication with supply channels provided with one-way valves.

In another embodiment of the present disclosure, a supply channel provided with a one-way valve may be arranged between the fluid outlet 273 of the reservoir 101 and the additional connection channel 393 such that the fluid may only flow from the reservoir 101 to the additional connection channel in unidirectional manner. In such an embodiment, the additional connection channel 393 and the additional connection channel 351 in communication therewith form a connection channel together.

The bottom of the lower flow dividing plate 312 is provided with a first multi-channel valve receiving portion 318, a second multi-channel valve receiving portion 319, a first pump connecting portion 314, a second pump connecting portion 315, and a third pump receiving portion 317 for mounting the first multi-channel valve 108, the second multi-channel valve 109, the first pump 104, the second pump 105 and the third pump 106 respectively.

The first multi-channel valve receiving portion 318 is provided with a plurality of first valve ports 390, and each of the plurality of first valve ports 390 is in communication with a corresponding fluid channel and the first multi-channel valve 108. The second multi-channel valve 109 is mounted in the second multi-channel valve receiving portion 319. A valve body of the second multi-channel valve 109 is provided with a plurality of second valve ports 399, and the second valve ports 399 are in communication with the additional connection channel 353 and the connection channel 358. The first multi-channel valve 108 and the second multi-channel valve 109 may cooperate, so as to change a communication relationship between different fluid channels.

The first pump connecting portion 314, the second pump connecting portion 315 and the third pump receiving portion 317 are provided with pump inlets 334, 335 and 337 respectively, and the pump inlets 334, 335 and 337 are in communication with corresponding fluid channels respectively. The pump inlet 334 is close to the supply channel 368, and the pump inlet 335 is close to the supply channel 367. The supply channels 368 and 367 are used for replenishing cooling fluids to corresponding circulation circuits. The supply channels 368 and 367 are arranged at vicinities of the pump inlets 334 and 335, so as to prevent fluids in the pumps from running out during operation.

In an embodiment of the present disclosure, one-way valves are arranged upstream of the pump inlets 334, 335, which may prevent the fluid from a plurality of external pipes from being mixed to some extent and thus affecting temperature control. In another embodiment of the present disclosure, a one-way valve may be arranged upstream of the pump inlet 337.

Figure 4:
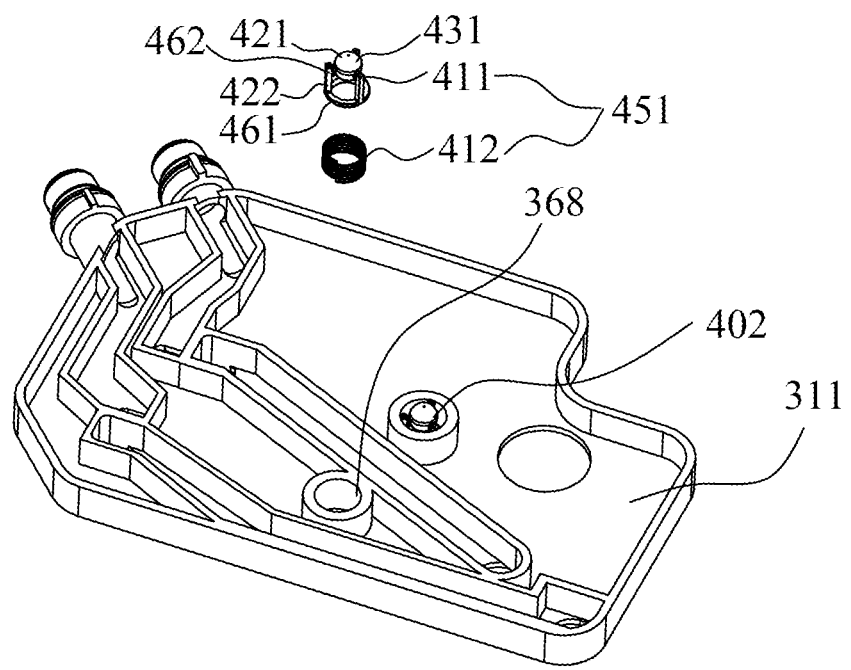
FIG. 4 is a schematic diagram of connection of a heat adjusting device and an external pipe according to the present disclosure.

FIG. 4 is a perspective view of the upper flow dividing plate and one-way valves in FIG. 3A. As shown in FIG. 4, one-way valves 451 and 402 are arranged in the supply channels 368 and 367. The one-way valve 451 and the one-way valve 452 have the same structure, and the structure of the one-way valve 451 is introduced below as an example. The one-way valve 451 includes a valve core 411 and a spring 412. The valve core 411 includes a working portion 421 and a supporting frame 422. A top of the working portion 421 is provided with a working surface 431, and the working surface 431 faces the reservoir 101 and has size larger than that of the fluid outlet 271. The working surface 431 may abut against the fluid outlet 271, so as to seal the fluid outlet 271 of the reservoir 101, thereby disconnecting the fluid storage cavity 205 from the supply channel 368. The working surface 431 is substantially a curved surface having a smooth transition, so as to facilitate sealing the fluid outlet 271. The supporting frame 422 includes an annular base 461 and a plurality of supporting rods 462. A space in the annular base 461 facilitates passing of a fluid. The base 461 is used for being in contact with the spring 412. One ends of the plurality of the supporting rods 462 are connected to the working portion 421, and the other ends thereof are connected to the base 461. The plurality of supporting rods 462 are spaced apart from each other, so as to allow fluids to pass through.

One end of the spring 412 abuts against the base 461, and the other end thereof abuts against a corresponding position of the lower flow dividing plate 312. When the one-way valve 451 is mounted in place in the upper flow dividing plate 311, the spring 412 is in a compressed state and applies an elastic force to the working portion 421, so as to seal the fluid outlet 271. When a pressure difference between the fluid storage cavity 205 and the connection channel 357 is greater than the elastic force of the spring 412, a fluid pushes the working portion 421 to be away from the fluid outlet 271 such that the fluid may enter the connection channel 357 through the fluid outlet 271.

In an embodiment of the present disclosure, the one-way valve 451 is integrated in the supply channel 368, the one-way valve 451 only includes a valve core 411 and a spring 412, and the valve core 411 and the spring 412 cooperate with an inner wall of the supply channel 368 to achieve a one-way communication function. That is, in this embodiment, the supply channel 368 has a function of a valve body of the one-way valve, and the one-way valve 451 may open or close pathway of the supply channel 368.

In another embodiment of the present disclosure, the one-way valve 451 further includes a valve body, and the valve core and the spring are arranged in the valve body. The one-way valve in such an embodiment may be mounted in the supply channel, or the valve body may be used as the supply channel.

Figure 5:
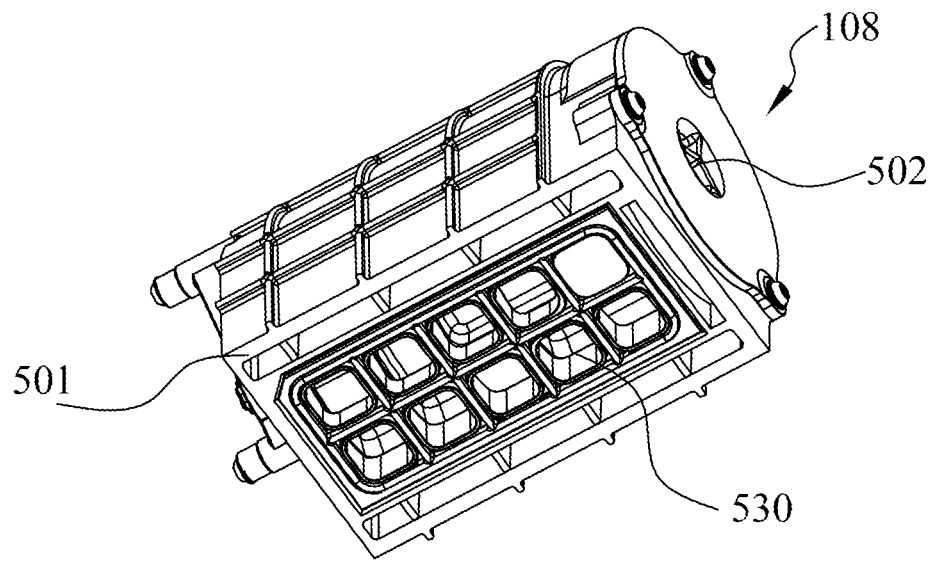
FIG. 5 is a perspective view of a first multi-channel valve in FIG. 1C.

FIG. 5 is a perspective view of the first multi-channel valve in FIG. 1C. As shown in FIG. 5, the multi-channel valve 108 includes a valve body 501 and a valve core 502 arranged in the valve body 501, the valve body 501 is provided with a plurality of openings 530, and the plurality of openings 530 correspond to the plurality of first valve ports 390 respectively. The valve core 502 may rotate in the valve body 501, so as to adjust a communication relationship with different first valve ports 390, adjust a communication relationship with different fluid channels, and adjust circulation circuits.

Figure 6:
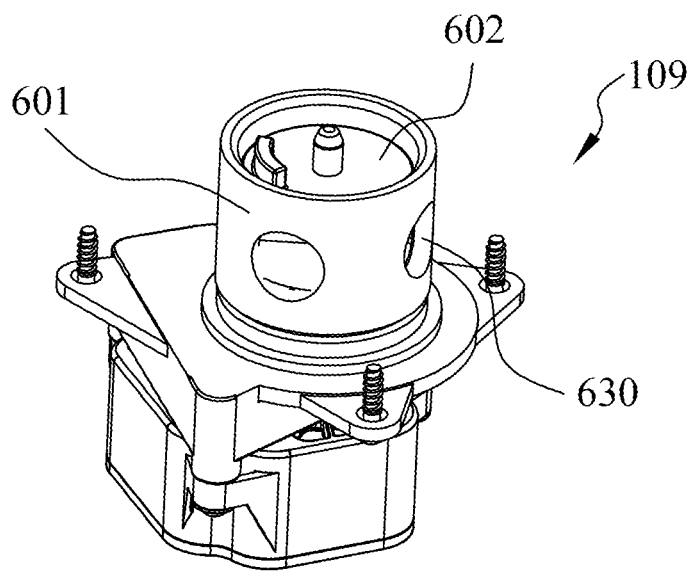
FIG. 6 is a perspective view of a second multi-channel valve in FIG. 1C.

FIG. 6 is a perspective view of the second multi-channel valve in FIG. 1C. As shown in FIG. 6, the multi-channel valve 108 includes a valve body 601 and a valve core 602 arranged in the valve body 601, the valve body 601 is provided with a plurality of openings 630, and the plurality of openings 630 correspond to the plurality of second valve ports 399 respectively. The valve core 602 may rotate in the valve body 601, so as to adjust communication relationship with different second valve ports 399, adjust a communication relationship with different fluid channels, and adjust circulation circuits for heat management.

Figure 7:
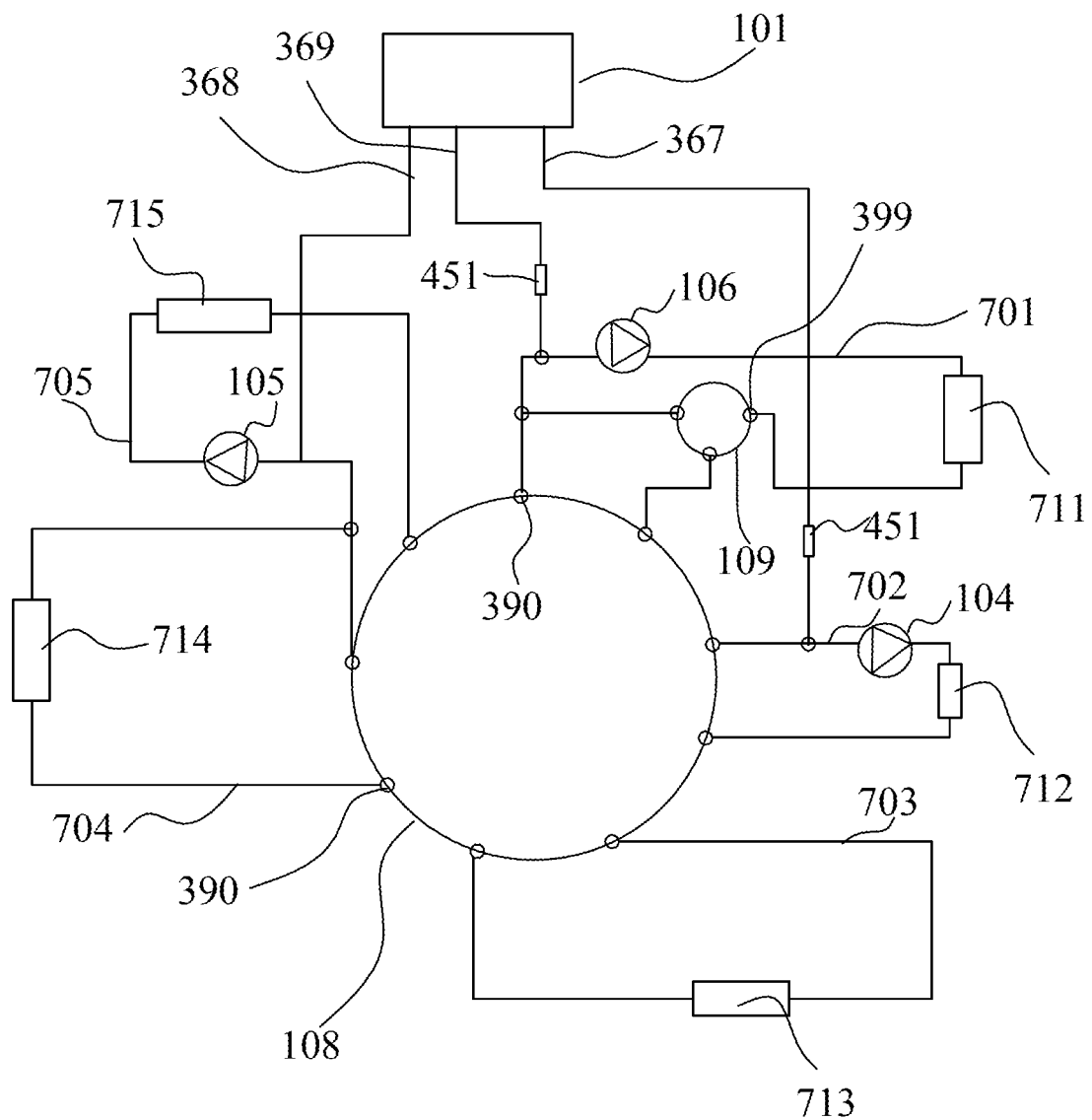
FIG. 7 is a schematic diagram of connection of a heat adjusting device and an external pipe according to the present disclosure.

FIG. 7 is a schematic diagram of connection of a heat adjusting device and an external pipe according to the present disclosure. As shown in FIG. 7, the first multi-channel valve 108 is provided with nine valve ports 390, and the second multi-channel valve 109 is provided with three valve ports 399. Each valve port is in communication with a corresponding fluid channel, and the fluid channels are in communication with different external apparatuses. The external pipes are in communication with corresponding fluid channels to form a plurality of working paths, and the plurality of working paths include a first working path 701, a second working path 702, a third working path 703, a fourth working path 704 and a fifth working path 705. The first working path 701, the second working path 702, the third working path 703, the fourth working path 704 and the fifth working path 705 are in communication with external apparatuses 711, 712, 713, 714 and 715 respectively. The third pump 106 is arranged in the fifth working path 705, the first pump 104 is arranged in the second working path 702, and the third pump 106 is arranged in the first working path 701. The external apparatuses are a power apparatus, a battery apparatus, a heat dissipation apparatus, a refrigeration apparatus, a heat exchanger, etc.

By switching the first multi-channel valve 108, two or more of the nine valve ports 390 may be in communication with each other, such that two or more of the first working path 701, the second working path 702, the third working path 703, the fourth working path 704 and the fifth working path 705 are in communication with each other, so as to form a plurality of circulation circuits. Pressure difference exist between the various circulation circuits, and a vicinity of an inlet of each pump is in communication with the reservoir 101, so as to prevent fluids in the pumps from running out during operation. During operation, the pumps may suck fluids from other circulation circuits into the circulation circuits of the pumps by means of the reservoir 101, such that the fluids are mixed. Since the temperatures of the circulation circuits are different, the mixture of fluids will affect accurate control over the temperatures. Therefore, in the present disclosure, one-way valves 451, 402 are arranged at vicinities of the first pump 104 and the third pump 106, so as to prevent fluids in corresponding circulation circuits from reversely flowing and then being pumped away by pumps in other circulation circuits. In an embodiment of the present disclosure, the one-way valves 451 and 402 are both arranged in supply channels between the reservoir 101 and the pump inlets, and one-way valve inlets are in communication with the reservoir.

In an embodiment of the present disclosure, a one-way valve is provided at each inlet with a pump, so as to prevent a fluid from reversely flowing.

In an embodiment of the present disclosure, differences in temperatures of part of circulation circuits that may be in communication with each other are small, one-way valves are not required to be arranged in the pump inlets of the corresponding circulation paths, and the number of the one-way valves may be less than the number of the pumps.

Figure 8A:
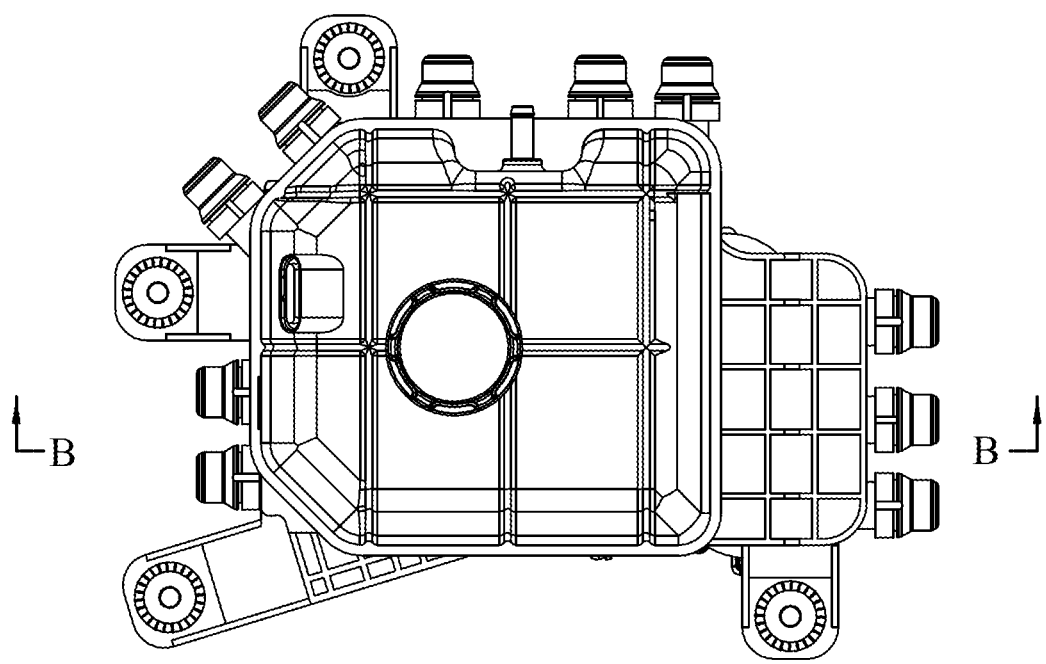
FIG. 8A is a top view of the fluid adjusting device in FIG. 1A.
Figure 8B:
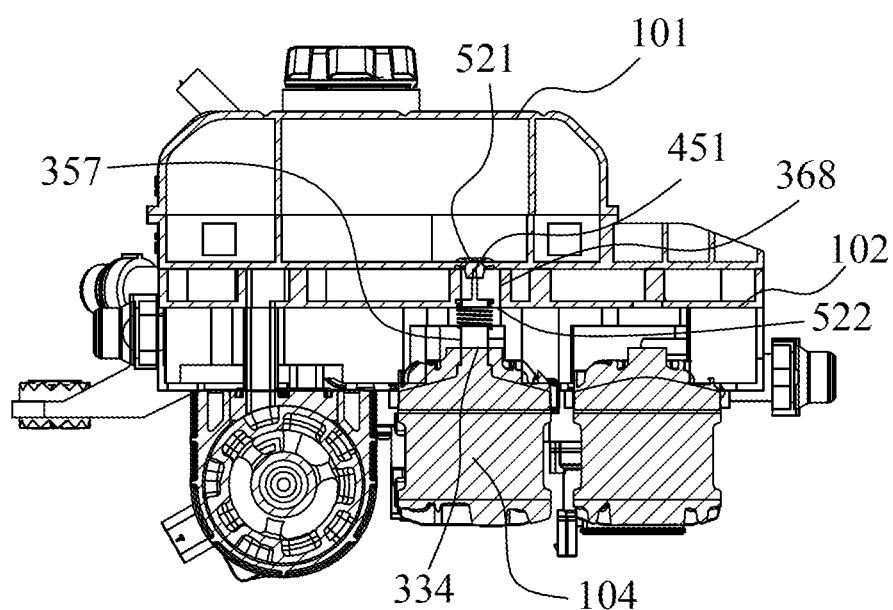
FIG. 8B is a sectional view along line B-B in FIG. 8A.

FIG. 8A is a top view of the fluid adjusting device in FIG. 1A. FIG. 8B is a sectional view along line B-B in FIG. 8A. FIGS. 8A and 8B respectively show a mounting position of a one-way valve. As shown in FIG. 8B, the one-way valve 451 is arranged between the first pump 104 and the reservoir 101, the supply channel 368 is arranged in the flow dividing component 102, one end of the supply channel 368 is in communication with the fluid outlet 271 of the reservoir 101, and the other end thereof is in communication with the connection channel 357 in the flow dividing component 102. The supply channel 368 is in communication with the pump inlet 334 of the first pump 104. The one-way valve 451 is arranged in the supply channel 368 such that a fluid may only flow from the reservoir 101 to the flow dividing component 102, but may not reversely flow. When the fluid adjusting device operates, the other pumps may not suck fluids from the supply channel 368 and the connection channel 357 in communication with the first pump 104, such that the fluids in the circulation circuits in communication with the first pump 104 are prevented from entering the other circulation circuits.

During operation of a vehicle, temperatures of a battery system and a power system may be required to be adjusted, for example, if the temperatures are too high, the temperatures are required to be reduced, and if the temperatures are too low, the temperatures are required to be increased to maintain normal operation. at this time, the temperature of the battery system is adjusted by adjusting the temperature of a cooling fluid in a battery cooling fluid circulation circuit, and the temperature of the power system is adjusted by adjusting the temperature of a cooling fluid in a power cooling fluid circulation circuit. A vehicle generally includes a heat dissipation device, a refrigeration device and a heating device. The heat dissipation device may carry out, for example, air cooling heat dissipation, or direct heat exchange heat dissipation with external air for heat exchange. Part of pipes in a heat dissipation cooling fluid circulation circuit is located in the heat dissipation device or close to the heat dissipation device, such that heat may be exchanged with the heat dissipation device, so as to reduce the temperature of a cooling fluid in the heat dissipation cooling fluid circulation circuit. The refrigeration device exchanges heat with the external environment through a refrigeration cycle of a refrigerant, and an evaporator in the refrigeration cycle may absorb the heat of the environment to reduce the temperature of the environment. Part of a refrigeration cooling fluid circulation circuit is close to an evaporator in the refrigeration device, such that heat may be exchanged with the evaporator, so as to reduce the temperature of a cooling fluid in the refrigeration cooling fluid circulation circuit. The heating device may heat the cooling fluid to raise the temperature of the cooling fluid. In order to adjust temperatures of cooling fluids in a battery cooling fluid circulation circuit and a power cooling fluid circulation circuit, according to actual requirements, the cooling fluids may be guided to corresponding pipes to exchange heat to achieve a proper temperature, and then the cooling fluids are returned to the battery cooling fluid circulation circuit and the power cooling fluid circulation circuit. In the present disclosure, by arranging the one-way valves, corresponding circulation circuits are not likely to mix, so as to accurately control temperatures.

The fluid adjusting device of the present disclosure further includes a gas discharge channel which may discharge gas in each circulation circuit to the reservoir, so as to prevent gas existing in each circulation circuit from affecting the heat exchange efficiency and the service life of the pumps.

Although the present disclosure is described in combination with examples of embodiments outlined above, various alternatives, modifications, variations, improvements, and/ or substantial equivalents that are known or current or to be anticipated before long may be obvious to those of at least ordinary skill in the art. Furthermore, the technical effects and/or technical problems described in the description are exemplary rather than limiting; and the disclosure in the description may be used to solve other technical problems and may have other technical effects. Accordingly, examples of embodiments of the present disclosure as stated above are intended to be illustrative rather than limiting. Various changes can be made without departing from the spirit or scope of the present disclosure. Therefore, the present disclosure is intended to embrace all known or earlier disclosed alternatives, modifications, variations, improvements, and/ or substantial equivalents.

What is claimed is:

1. A fluid adjusting device, comprising:
    a reservoir, wherein the reservoir is provided with a fluid storage cavity and at least two fluid outlets, the at least two fluid outlets are in communication with the fluid storage cavity, and the fluid storage cavity is configured to store a cooling fluid;
    at least two connection channels, wherein the at least two connection channels can be connected to at least two circulation circuits respectively;
    at least two supply channels, wherein the at least two fluid outlets are in communication with the at least two connection channels by means of the at least two supply channels respectively; and
    at least one one-way valve, wherein the at least one one-way valve is arranged in at least one supply channel of the at least two supply channels, and is configured to enable a fluid to flow from the reservoir to a corresponding connection channel in unidirectional manner.

2. The fluid adjusting device according to claim 1, further comprising: a flow dividing component, wherein the flow dividing component is connected to the reservoir, and the at least two connection channels are fluid channels arranged on the flow dividing component.

3. The fluid adjusting device according to claim 2, further comprising: at least one pump, wherein the at least one pump is arranged in one connection channel of the at least two connection channels, and is configured to enable a fluid in the corresponding connection channel to flow in a predetermined direction.

4. The fluid adjusting device according to claim 3, wherein, in a flow direction of the fluid in the connection channel, the at least one pump is located downstream of a connection section between the corresponding supply channel and the connection channel.

5. The fluid adjusting device according to claim 4, wherein the at least one pump is close to the connection section between the corresponding supply channel and the connection channel.

6. The fluid adjusting device according to claim 2, further comprising:
    several additional connection channels, wherein the several additional connection channels are arranged on the flow dividing component; and
    a multi-channel valve portion, wherein the multi-channel valve portion is connected to the several additional connection channels and the at least two connection channels, and the multi-channel valve portion can be adjusted to change a connection relationship between the several additional connection channels and the at least two connection channels such that the fluid adjusting device is configured to form different circulation circuits.

7. The fluid adjusting device according to claim 6, wherein the reservoir comprises a reservoir housing, a bottom of the reservoir housing and the flow dividing component form part of the several additional connection channels and the at least two connection channels.

8. The fluid adjusting device according to claim 7, wherein the at least one one-way valve is integrated in the corresponding supply channel.

9. The fluid adjusting device according to claim 7, wherein the reservoir comprises an inner gas discharge channel, the inner gas discharge channel is located in the reservoir, a first end of the inner gas discharge channel penetrates through the bottom of the reservoir housing to be in communication with one or more of the several additional connection channels and the at least two connection channels, so as to receive gas discharged from the several additional connection channels and the at least two connection channels, and a second end of the inner gas discharge channel is spaced apart from a top of the reservoir; and the reservoir further comprises an inner gas discharge channel cover portion, the inner gas discharge channel cover portion is in the shape of a hollow cylinder, the inner gas discharge channel cover portion extends downwardly from the top of the reservoir, the inner gas discharge channel can enter the inner gas discharge channel cover portion, and a side wall opening is provided on a side wall of the inner gas discharge channel cover portion, so as to allow gas in the inner gas discharge channel to pass through.

10. The fluid adjusting device according to claim 1, wherein the at least one one-way valve is configured to prevent a fluid from flowing to the reservoir, so as to prevent a fluid in the circulation circuit connected to the at least one one-way valve from being mixed with fluids in other circulation circuits.

* * * * *